United States Patent [19]

Mori et al.

[11] Patent Number: 5,607,606
[45] Date of Patent: Mar. 4, 1997

[54] LASER BEAM MACHINE FOR PERFORMING PIERCING AND CUTTING VIA FOCUS CHANGE

[75] Inventors: Atsushi Mori; Yoshinori Nakata, both of Yamanashi, Japan

[73] Assignee: Fanuc Ltd., Japan

[21] Appl. No.: 603,955

[22] Filed: Feb. 16, 1996

Related U.S. Application Data

[63] Continuation of Ser. No. 382,640, Feb. 2, 1995, abandoned.

[30] Foreign Application Priority Data

Feb. 10, 1994 [JP] Japan .................................. 6-016746

[51] Int. Cl.[6] .................................................. B23K 26/02
[52] U.S. Cl. ................................... 219/121.67; 219/121.7; 219/121.78; 219/121.75; 364/474.08
[58] Field of Search ......................... 219/121.67, 121.75, 219/121.72, 121.78, 121.7, 121.61; 364/474.08, 474.22, 474.28, 474.35

[56] References Cited

U.S. PATENT DOCUMENTS

| | | | |
|---|---|---|---|
| 4,503,313 | 3/1985 | Tsutsumi | 219/121.67 |
| 5,049,723 | 9/1991 | Macdonald | 219/121.83 |
| 5,065,330 | 12/1991 | Karube et al. | 219/121.82 |
| 5,247,948 | 9/1993 | Androeli et al. | 219/121.67 |
| 5,252,805 | 10/1993 | Nakata et al. | 219/121.72 |
| 5,374,803 | 12/1994 | Yamada | 219/121.72 |
| 5,434,383 | 7/1995 | Nakata et al. | 219/121.71 |
| 5,491,318 | 2/1996 | Sugawara et al. | 219/121.67 |

*Primary Examiner*—Mark H. Paschall
*Attorney, Agent, or Firm*—Staas & Halsey

[57] ABSTRACT

A laser beam machine which makes it possible to effect piercing in a shortest time period and cutting with high accuracy. A program-reading device reads a machining program. A first distance changeover-directing device directs that a workpiece-to-converging point distance between a surface of a workpiece and a converging point of a laser beam is set to one value suitable for piercing when it detects a piercing program in the machining program. Further, a second distance changeover-directing device directs that the workpiece-to-converging point distance is set to one value suitable for cutting when it detects a cutting program in the machining program. A distance control device operates to control the workpiece-to-converging point distance in accordance with directions from the first and second distance changeover-directing devices. That is, the workpiece-to-converging point distance is set to the optimum value for piercing when piercing is carried out, while it is set to the optimum value for cutting when cutting is carried out, thereby completing piercing in a short time period, and effecting cutting with high accuracy.

4 Claims, 5 Drawing Sheets

LASER BEAM MACHINE FOR PERFORMING PIERCING AND CUTTING VIA FOCUS CHANGE

This application is a continuation of application Ser. No. 08/382,640, filed Feb. 2, 1995, now abandoned.

BACKGROUND OF THE INVENTION

1. Field of the invention

This invention relates to a laser beam machine for performing laser beam machining according to a machining program, and more particularly to a laser beam machine which executes laser beam machining under the optimum machining conditions.

2. Description of the Related Art

Conventionally, when a laser beam machine cuts a workpiece by collecting the laser beam and irradiating same on the workpiece, the positional relationship between a surface of the workpiece and a converging point of the laser beam has much influence on the performance of the laser beam machine. The optimum position of the converging point of the laser beam relative to the surface of the workpiece varies with the kind of material of the workpiece. Therefore, in cutting the workpiece as well, the converging point of the laser beam is set to the optimum position dependent on the material of the workpiece.

The position of the converging point of the laser beam is fixed for the same kind of material.

However, recent research revealed the fact that even in cutting off the same kind of material, the optimum position of the converging point of the laser beam varies between piercing carried out at the start of the machining and cutting carried out thereafter.

However, conventional laser beam machines are adapted to cut off workpieces by setting the position of the converging point of the laser beam to the optimum position for cutting for the purpose of enhancing cutting accuracy, which requires a time period unnecessarily long for piercing.

SUMMARY OF THE INVENTION

The present invention has been made in view of these circumstances, and the object thereof is to provide a laser beam machine which is capable of performing piercing in a shortest time period and cutting with high accuracy, in a reconciled manner.

To attain the object, the present invention provides a laser beam machine for machining a workpiece by a laser beam according to a machining program, comprising program-reading means for reading the machining program, first distance changeover-directing means for directing that a workpiece-to-converging point distance between a surface of the workpiece and a converging point of the laser beam is set to one suitable for piercing, when the first distance changeover-directing means detects a piercing program in the machining program read by the program-reading means, second distance changeover-directing means for directing that the workpiece-to-converging point distance is set to one suitable for cutting, when the second distance changeover-directing means detects a cutting program in the machining program read by the program-reading means, and distance control means for operating to control the workpiece-to-converging point distance in accordance with directions from the first distance changeover-directing means and the second distance changeover-directing means.

The program-reading device reads the machining program. The first distance changeover-directing device directs that the workpiece-to-converging point distance between the surface of the workpiece and the converging point of the laser beam is set to one suitable for piercing when it detects the piercing program in the machining program. Further, the second distance changeover-directing device directs that the workpiece-to-converging point distance is set to one suitable for cutting when it detects the cutting program in the machining program. The distance control device operates to control the workpiece-to-converging point distance in accordance with directions from the first and second distance changeover-directing devices.

That is, the workpiece-to-converging point distance is set to the optimum value for piercing when piercing is carried out, while it is set to the optimum value for cutting when cutting is carried out, whereby piercing is completed in a short time period, and cutting is effected with high accuracy.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The invention will now be described in detail with reference to drawings showing embodiments of the invention.

Figure 1:
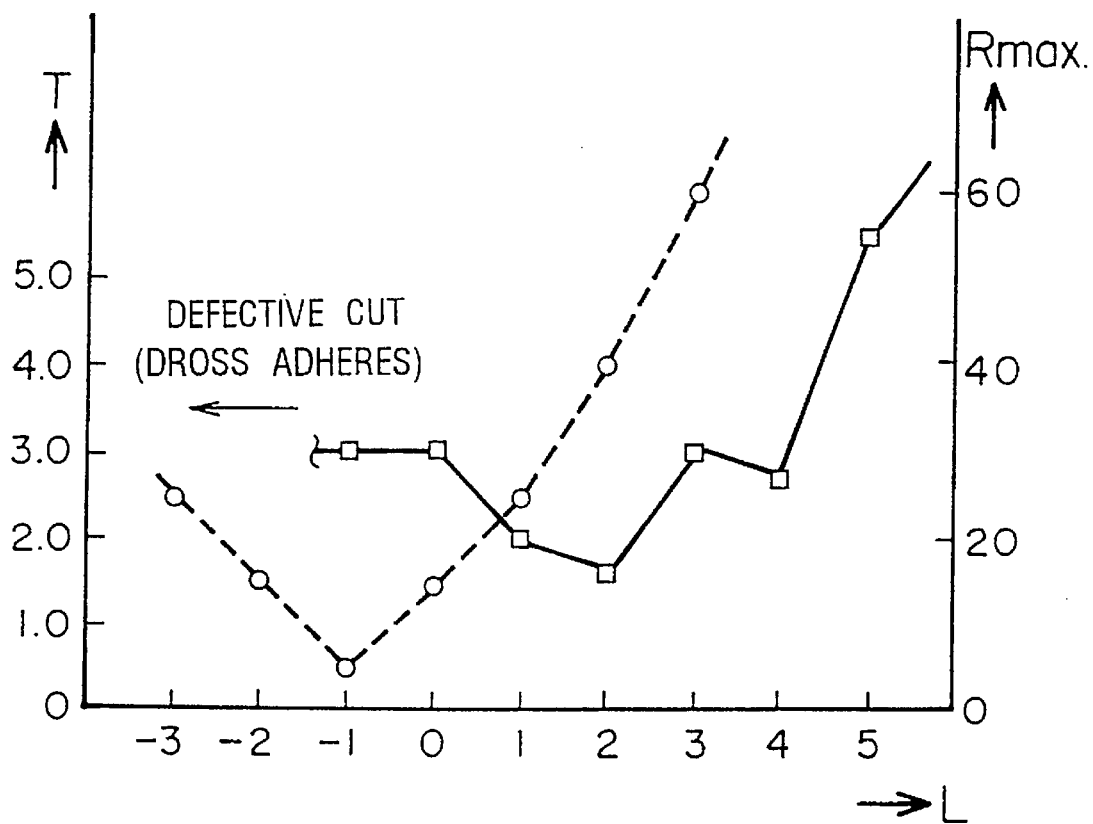
FIG. 1 is a diagram showing the relationship between a converging point of a laser beam and machining characteristics.

FIG. 1 shows the relationship between a converging point of a laser beam and machining characteristics of the laser beam. In the figure, the abscissa represents a distance L from the surface of a workpiece and a converging point of a laser beam, while an ordinate on the left-hand side represents a time period T required in piercing, and an ordinate on the right-hand side represents a roughness $R_{max}$ of the surface of a cut. The data is obtained by using a carbon dioxide laser having a rated output of 1500 W, as a laser oscillator, under the machining conditions of a workpiece material of SS400, a workpiece thickness of 6 mm, and a focal length of a converging lens of 5 inches. In piercing designated by a broken line in the figure, the time period T required therefor becomes the shortest when the converging point of the laser beam is positioned 1 mm below the surface of the workpiece. Further, in cutting designated by a solid line, the roughness $R_{max}$ of a cut becomes the minimum when the converging point of the laser beam is positioned 2 mm above the surface of the workpiece.

That is, since piercing does not require machining accuracy, the converging point of the laser beam is best set to approximately 1 mm below or inside the surface of the workpiece to terminate piercing in as short a time period as possible, whereas in the case of cutting, the converging point of the laser beam is best set to 2 mm above or away from the surface of the workpiece to enhance machining accuracy. Thus, the optimum position of the converging point of the laser beam differs between piercing and cutting carried out in the machining of cutting off the workpiece.

In an example illustrated in FIG. 1, piercing is carried out with the converging point of the laser beam being set to a point 2 mm away from the surface of the workpiece. In such a case, piercing takes approximately 4 seconds. In contrast, piercing is completed in less than one second, if it is carried out by a laser beam having its converging point set to a point 1 mm deep or below the surface of the workpiece, thereby making it possible to reduce the piercing time by more than three seconds.

Figure 2:
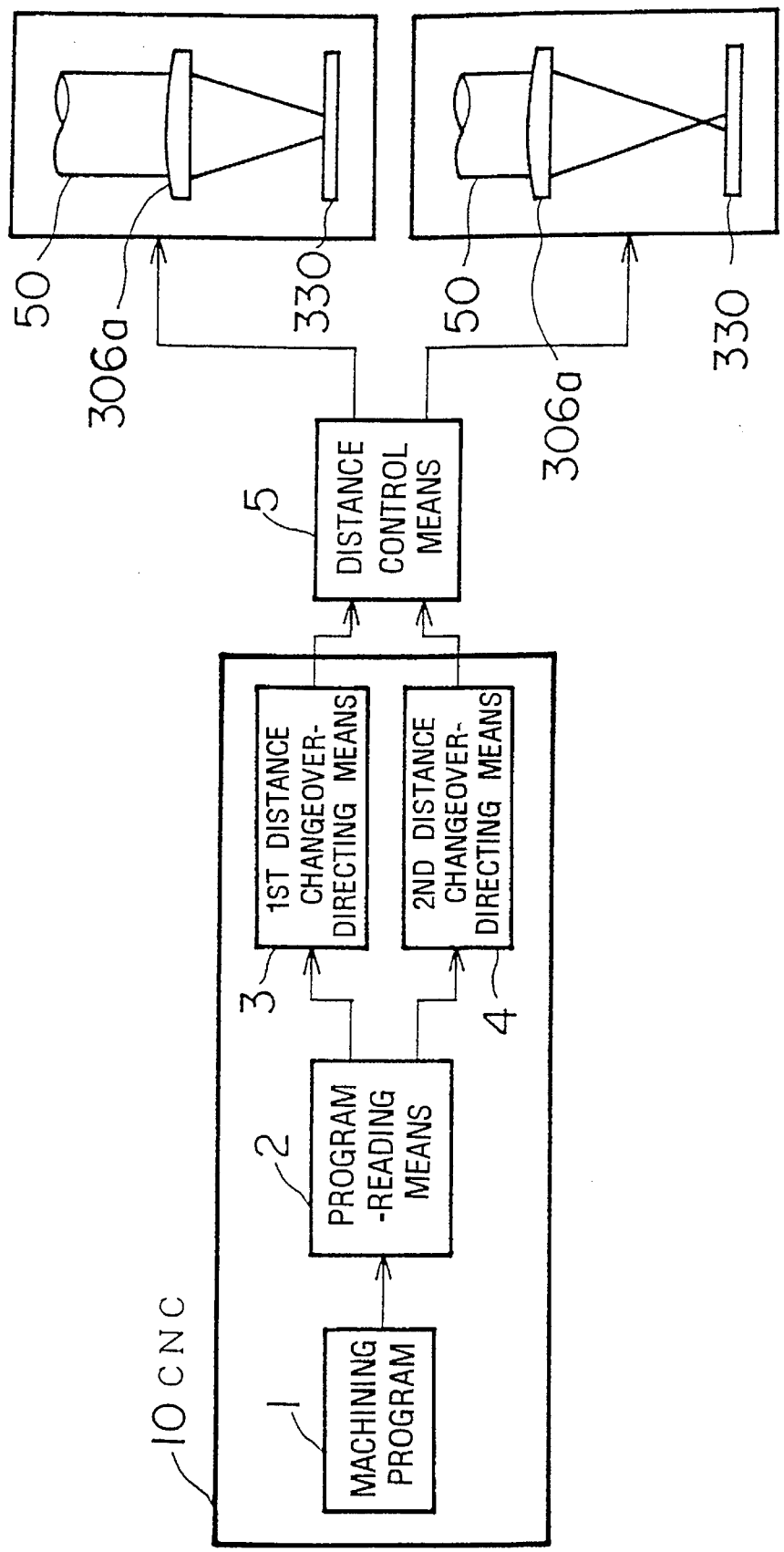
FIG. 2 is a block diagram showing construction of the invention.

FIG. 2 shows the whole arrangement of a laser beam machine according to a first embodiment of the invention. In the figure, program-reading means 2 reads a machining program 1. First distance changeover-directing means 3 delivers a command signal for setting the workpiece-to-converging point distance between a surface of a workpiece and a converging point of a laser beam to one suitable for piercing when it detects a piercing program in the machining program 1 thus read. Further, second distance changeover-directing means 4 delivers a command signal for setting the workpiece-to-converging point distance to one suitable for cutting when it detects a cutting program in the machining program 1. Distance control means 5 operates to control the workpiece-to-converging point distance in accordance with the command signals from the first and second distance changeover-directing means 3 and 4.

That is, the workpiece-to-converging point distance is set to the optimum value for piercing when piercing is carried out, while it is set to the optimum value for cutting when cutting is carried out, whereby piercing is completed in a short time period, and cutting is carried out with high accuracy.

Figure 3:
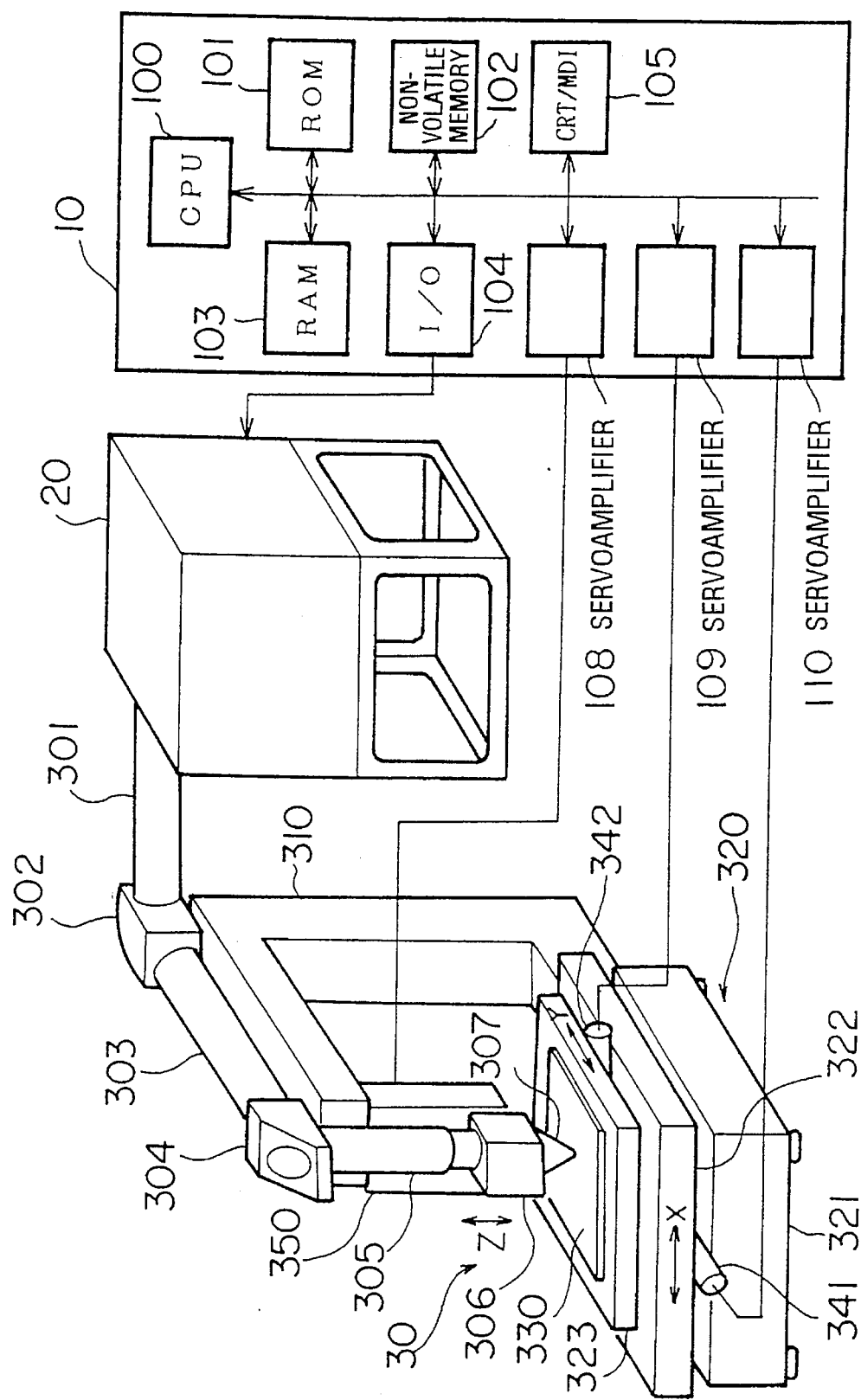
FIG. 3 is a diagram showing the whole arrangement of a laser beam machine according to a first embodiment of the invention.

FIG. 3 shows the whole arrangement of a laser beam machine according to the first embodiment of the invention, which comprises a computer numerical control (CNC) unit 10, a laser oscillator 20 and a working machine 30.

The CNC unit 10 is composed of a processor 100 forming a central part thereof, a ROM 101 formed by an EPROM or EEROM for storing a system program therein, and a nonvolatile memory 102 formed by a CMOS backed up by a battery, not shown, for storing a machining program, a program according to the invention, various parameters, and so forth, for storage even after the power is turned off. The system program, the program according to the invention, the various parameters, and so forth are transferred to the RAM 103 for storage therein when the power is turned on to the CNC unit 10. The processor 100 reads the machining program based on the system program stored in the RAM 103, to control the overall operation of the laser beam machine. Further, the processor 100 controls the workpiece-to-converging point distance between the surface of the workpiece and the converging point of the laser beam for changes between piercing at the start of machining and cutting executed thereafter. Details of the control of the workpiece-to-converging point distance will be described later.

The CNC unit 10 also includes an I/O unit 104 for converting a control signal from the processor 100, and delivers the converted control signal to the laser oscillator 20. The laser oscillator 20 emits a pulsed laser beam according to the converted control signal. The laser beam is transmitted via a light guide passage 301, a mirror unit 302, a light guide passage 303, a mirror unit 304, a light guide passage 305, and a machining head 306, and emitted from a nozzle 307 onto a workpiece 330.

The CNC unit 10 has a CRT/MDI 105 connected thereto, via which various programs and data are input in an interactive manner.

The working machine 30 is composed of a support frame 310 supporting the light guide passage 303, the mirror units 302,304, etc., and a table support 320 supporting a table 323. On an open end of the support frame 310 is arranged a machining head-moving mechanism 350. The machining head 306 is arranged at an open end of the light guide passage 305 in the form of an extendible telescope, and moved in Z direction according to the rotation of a servomotor, not shown, provided within the machining head-moving mechanism 350.

A table 322 is provided on a basis table 321 of the table support 320, and further a table 323 is provided on the table 322. The tables 322 and 323 are moved in X direction and Y direction by movement mechanisms 341 and 342 formed by servomotors provided on respective lower end sides of the tables 322 and 323. The workpiece 330, which is fixed on the table 323, can be freely moved on an X-Y plane.

The servomotors forming the machining head-moving mechanism 350, and the movement mechanisms 341 and 342 are connected to servoamplifiers 108,109, and 110 of the CNC unit 10, and have their rotations controlled by respective axial control signals from the processor 100. The tables 322,323, and the machining head 306 are moved according to the rotations of the respective servomotors. The laser beam emitted from the nozzle 307 depicts a cutting path on the workpiece 330 according to the movements of the tables 322 and 323, thereby cutting the workpiece into a predetermined shape.

Figure 4:
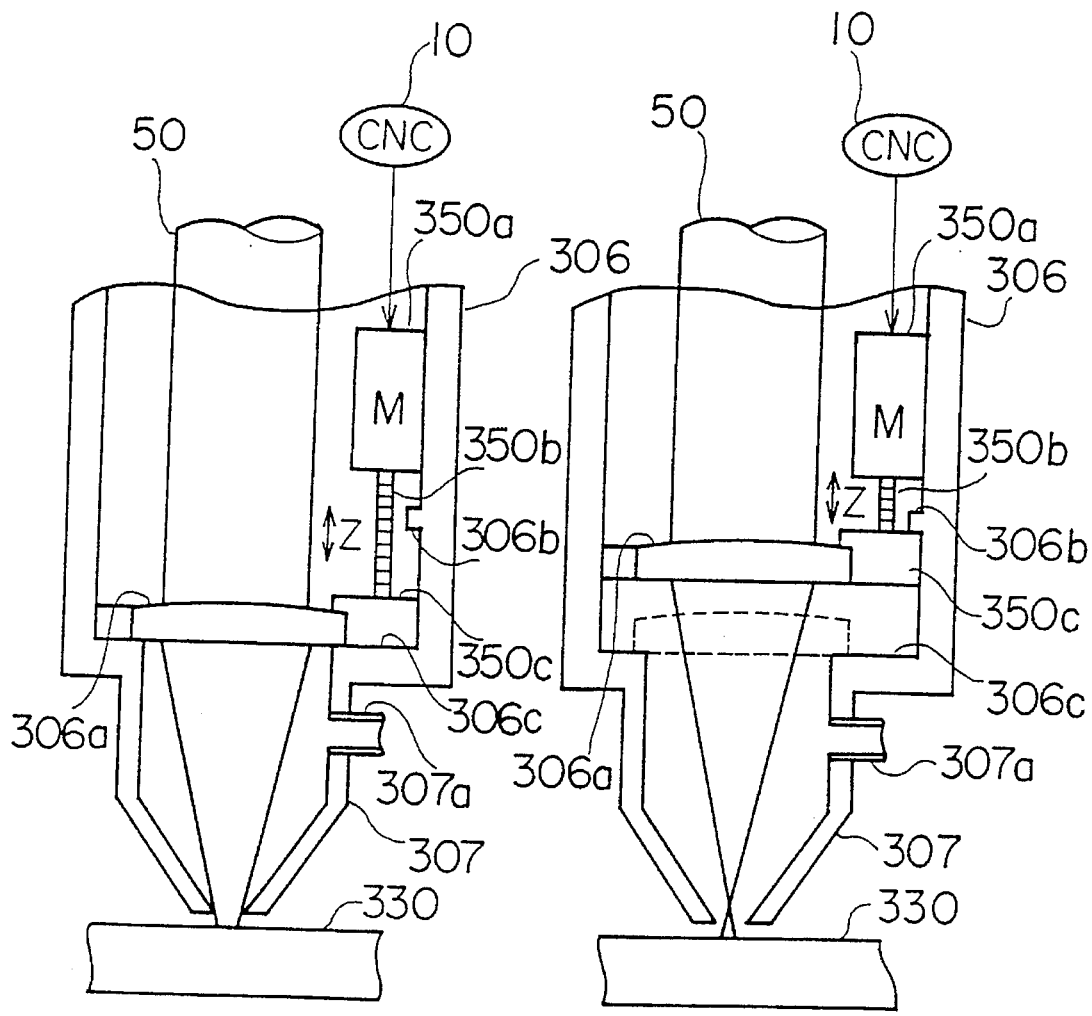
FIGS. 4 (A) and 4 (B) show diagrams useful in explaining a workpiece-to-converging point distance control carried out according to the invention, in which FIG. 4 (A) shows a state of the laser beam machine set for piercing, while FIG. 4 (B) shows a state of same set for cutting off the workpiece.

FIG. 4 (A) and FIG. 4 (B) illustrate how the workpiece-to-converging point distance is controlled by the laser beam machine according to the present embodiment, in which FIG. 4(A) shows a state of the laser beam machine controlled for piercing, while FIG. 4 (B) shows a sate of the laser beam machine controlled for cutting. In these figures, reference numeral 350a designates an actuator (motor) provided on an inner peripheral wall of the machining head 306. The actuator 350a is responsive to a command signal from the CNC unit 10 for causing rotation of a ball screw 350b to move a movable part 350c in Z direction. The movable part 350c is rigidly fixed to a converging lens 306a for converging the laser beam 50, for movement in unison therewith, whereby the converging lens 306a is moved in Z direction according to the rotation of the actuator 350a. The laser beam 50 is converged by the converging lens 306a, and emitted from a tip of the nozzle 307 onto the workpiece 330, while assist gas from an assist gas-introducing port 307a is blown out therefrom onto same.

When the CNC unit 10 (processor 100) detects the piercing program in the machining program, it delivers a command signal to the actuator 350a to cause rotation of the actuator 350a. Rotation of the actuator 350a causes the movable part 350c to abut on a surface 306c of a lower end of the machining head 306, as shown in FIG. 4(A). As a result, the distance between the converging lens 306a and the surface of the workpiece 330 is decreased, so that the converging point of the laser beam 50 is positioned inside the workpiece 330.

On the other hand, when the CNC unit 10 (processor 100) detects the cutting program in the machining program, it delivers a command signal to the actuator 350a to cause rotation of the actuator 350a. Rotation of the actuator 350a causes the movable part 350c to abut on a stopper 306b provided on the inner peripheral wall of the machining head 306, as shown in FIG. 4 (B). As a result, the distance between the converging lens 306a and the surface of the workpiece 330 is increased, so that the converging point of the laser beam 50 is positioned above the workpiece 330.

Thus, according to the present embodiment, to cut the workpiece 330 by laser beam, the position of the converging lens 306a is controlled during piercing as a first stage of machining such that the converging point of the laser beam 50 is positioned inside the workpiece 330. This position of the converging point of the laser beam 50 is a position set so as to execute piercing in a short time period. Further, during cutting executed after completion of piercing, the position of the converging lens 306a is controlled such that the converging point of the laser beam 50 is positioned above the workpiece 330. This position of the converging point of the laser beam 50 is a position set so as to execute cutting with high accuracy.

That is, the distance between the surface of the workpiece 330 and the converging point of the laser beam (i.e. workpiece-to-converging point distance) is set to the optimum value for piercing when piercing is carried out, while it is set to the optimum value for cutting when cutting is carried out. Therefore, it is possible to complete piercing, which does not require accuracy, in a short time period, as well as to execute cutting, which requires accuracy, with high accuracy, thereby achieving piercing completed in a shortest time period and cutting performed by laser beam with a cut having the best quality, to realize high-speed and high-accuracy laser-beam cutting.

Figure 5:
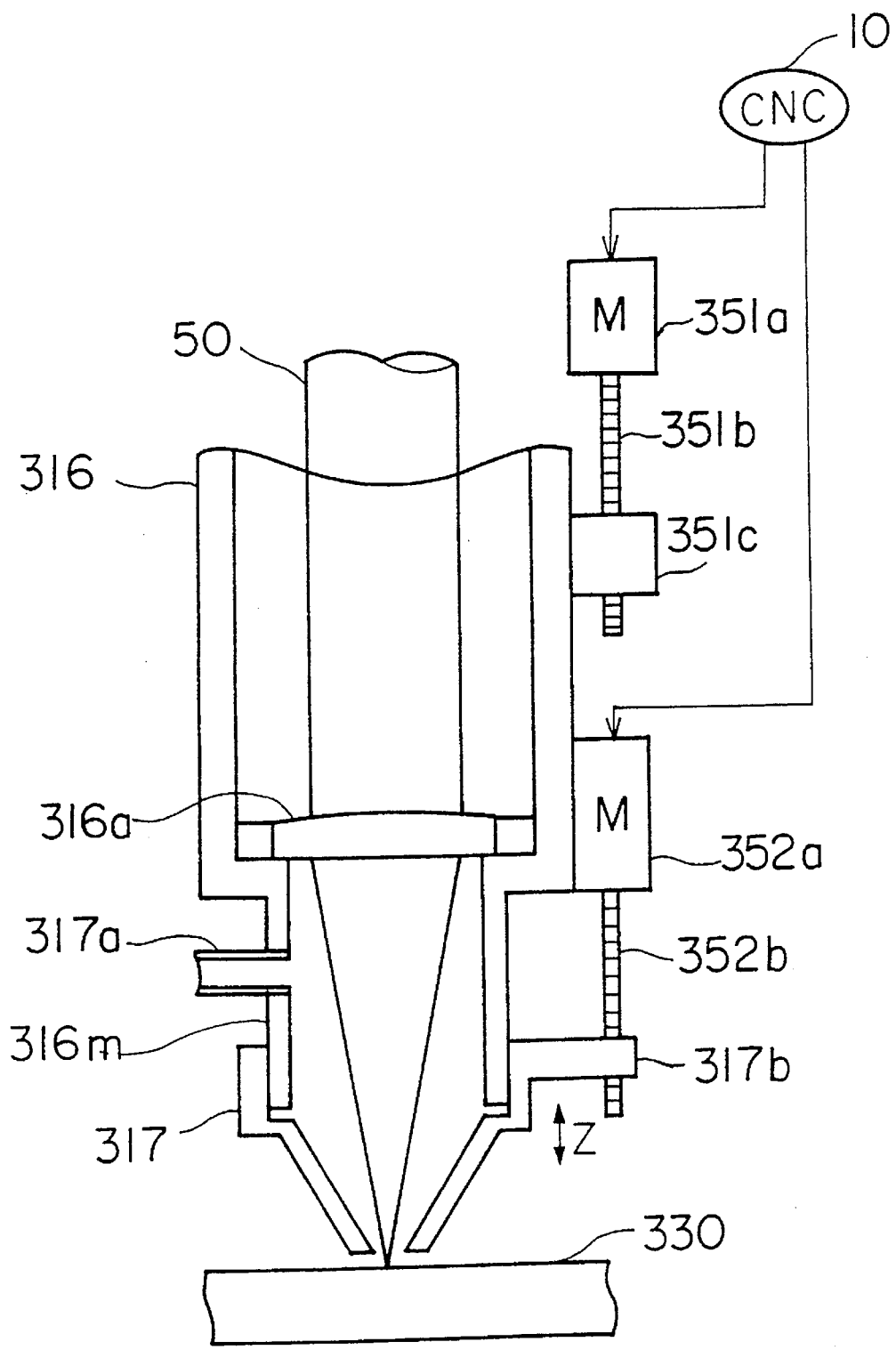
FIG. 5 is a diagram showing a laser beam machine according to a second embodiment of the invention.

FIG. 5 shows a second embodiment of the invention. In the figure, a machining head 316 has an open end portion 316m which has a nozzle 317 fit thereon such that the nozzle 317 can be moved in Z direction. Two actuators (motors) 351a and 352a are provided for the machining head 316. One 351a of the actuators is responsive to a command signal from the CNC unit 10 for causing rotation of a ball screw 351b to thereby move a movable part 351c in Z direction. The movable part 351c is rigidly fixed to the peripheral wall of the machining head 316, so that the machining head 316 moves in Z direction according to the rotation of the actuator 351a. The other actuator 352a, similarly to the actuator 351a, is also responsive to a command signal from the CNC unit 10 for causing rotation of a ball screw 352b to thereby move a projection 317b provided on an upper end of the nozzle 317 in Z direction, so that the nozzle 317 is moved in Z direction according to the rotation of the actuator 352a.

The laser beam 50 is converged by a converging lens 316a, and emitted from a tip of the nozzle 317 onto the workpiece 330, while assist gas from an assist gas-introducing port 317a is blown out therefrom onto same.

When the CNC unit 10 (processor 100) detects the piercing program in the machining program, it delivers command signals to the actuators 351a and 352a to cause rotation of the actuators 351a and 352a. Rotation of the actuator 351a causes the machining head 316 to move downward to a predetermined position. As a result, the distance between the converging lens 316a and the surface of the workpiece 330 is decreased, so that the converging point of the laser beam 50 is positioned inside the workpiece 330. It should be noted that although the downward movement of the machining head 316 also causes a downward displacement of the nozzle 317, which is fit on the machining head 316, the nozzle 317 is at the same time moved upward by an amount corresponding to the downward displacement caused by the actuator 351a, by rotation of the actuator 352a, whereby the gap between the tip of the nozzle 317 and the surface of the workpiece 330 is held constant.

On the other hand, when the CNC unit 10 detects the cutting program in the machining program, it delivers command signals to the actuators 351a and 352a to cause rotation of the actuators 351a and 352a. Rotation of the actuator 351a causes the machining head 316 to move upward to a predetermined position. As a result, the distance between the converging lens 316a and the surface of the workpiece 330 is increased, so that the converging point of the laser beam 50 is positioned above the workpiece 330. It should be noted that although the upward movement of the machining head 316 causes an upward displacement of the nozzle 317, which is fit on the machining head, the nozzle 317 is at the same time moved downward by an amount corresponding to the upward displacement caused by the actuator 351a, by rotation of the actuator 352a, whereby the gap between the tip of the nozzle 317 and the surface of the workpiece 330 is held constant.

Thus, according to the present embodiment, similarly to the first embodiment, to cut the workpiece 330 by laser beam, at the first stage of piercing, the machining head 316 is moved for control of the position of the converging lens 316a such that the converging point of the laser beam 50 is positioned inside the workpiece 330. Further, at the stage of cutting executed after piercing, the machining head 316 is moved for control of the position of the converging lens 316a such that the converging point of the laser beam 50 is positioned above the workpiece 330. Therefore, it is possible to complete piercing, which does not require accuracy, in a short time period, as well as to execute cutting, which requires accuracy, with high accuracy. Further, the nozzle 317 is constructed according to the present embodiment such that during the above process of control of the position of the converging lens 316a, it can be moved so as to hold constant the gap between the tip of the nozzle 317 and the surface of the workpiece 330. Therefore, it is possible to suppress variation of a finish of a machined workpiece caused by changes in the gap between the tip of the nozzle 317 and the surface of the workpiece 330, which makes it possible to preserve an uniform quality of finish of machining.

Although in the above description, the program to be used according to the invention, is made and stored by means of the CRT/MDI of the CNC unit 10, this is not imitative, but the program may be made by an external device, such as a personal computer, and then stored into the CNC unit 10.

As described heretofore, according to the present invention, in cutting the workpiece by laser beam, the workpiece-to-converging point distance is set to one suitable for piercing when piercing as the first stage of cutting process is carried out, and to one suitable for cutting when the following stage of cutting is carried out after piercing.

Therefore, it is possible to complete piercing, which does not require accuracy, in a short time period, as well as to execute cutting, which requires accuracy, with high accuracy, thereby achieving piercing completed in a shortest time period and cutting performed by laser beam with a cut having the best quality, to realize high-speed and high-accuracy laser-beam cutting.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A laser beam machine for machining a workpiece by a laser beam according to a machining program, comprising:

program-reading means for reading said machining program;

focusing means for focusing said laser beam to a converging point;

first distance setting means for setting a workpiece-to-converging point distance between a surface of said workpiece and said converging point of said laser beam to a first value which produces a minimum machining time value for performing a piercing operation on said workpiece, based on said program-reading means reading a piercing program in said machining program;

second distance setting means for setting said workpiece-to-converging point distance to a second value different from said first value which produces a maximum machining accuracy value for performing a cutting operation on said workpiece, based on said program-reading means reading a cutting program in said machining program; and distance control means for controlling said workpiece-to-converging point distance in response to said first distance setting means and said second distance setting means.

2. A laser beam machining according to claim 1, further including a machining head having a converging lens for converging said laser beam to said converging point, said focusing means including said converging lens, wherein said distance control means comprises a converging lens-moving actuator for moving said converging lens upward and downward.

3. A laser beam machine according to claim 1, further including a machining head and a nozzle fit on an open end of said machining head, wherein said distance control means comprises a machining head-moving actuator for moving said machining head upward and downward and a nozzle-moving actuator for moving said nozzle upward and downward.

4. A laser beam machine according to claim 1, wherein said workpiece-to-converging point distance set to said first value for performing said piercing operation is shorter than said workpiece-to-converging point distance set to said second value for performing said cutting operation.

* * * * *